(12) United States Patent
Arita et al.

(10) Patent No.: US 8,817,851 B2
(45) Date of Patent: Aug. 26, 2014

(54) WIRELESS COMMUNICATIONS DEVICE AND WIRELESS COMMUNICATIONS METHOD

(75) Inventors: Setsuo Arita, Hitachiota (JP); Shinji Murata, Hitachi (JP); Yuji Ichinose, Mito (JP); Hideaki Masuko, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/578,053

(22) PCT Filed: Feb. 15, 2011

(86) PCT No.: PCT/JP2011/053070
§ 371 (c)(1),
(2), (4) Date: Aug. 9, 2012

(87) PCT Pub. No.: WO2011/105245
PCT Pub. Date: Sep. 1, 2011

(65) Prior Publication Data
US 2012/0314741 A1    Dec. 13, 2012

(30) Foreign Application Priority Data
Feb. 26, 2010  (JP) .................................. 2010-041235

(51) Int. Cl.
*H04B 1/38*    (2006.01)
(52) U.S. Cl.
USPC ......................................................... 375/219
(58) Field of Classification Search
USPC ........ 375/219, 222, 240.27, 240.28; 370/428, 370/474, 536
See application file for complete search history.

(56) References Cited

U.S. PATENT DOCUMENTS

| | | | | |
|---|---|---|---|---|
| 2005/0220145 A1* | 10/2005 | Nishibayashi et al. | ....... | 370/474 |
| 2007/0198900 A1* | 8/2007 | Ryu et al. | ...................... | 714/776 |
| 2007/0297451 A1* | 12/2007 | Kim et al. | ..................... | 370/469 |
| 2008/0049707 A1* | 2/2008 | Kwon et al. | .................. | 370/343 |

FOREIGN PATENT DOCUMENTS

| | | |
|---|---|---|
| JP | 63-164533 | 7/1988 |
| JP | 10-93584 | 4/1998 |
| JP | 2001-045012 | 2/2001 |
| JP | 2001-45012 | 2/2001 |

(Continued)

OTHER PUBLICATIONS

JP Office Action for Japanese Application No. 2010-041235, issued on Jul. 17, 2013.

(Continued)

*Primary Examiner* — Sam K Ahn
*Assistant Examiner* — Syed Haider
(74) *Attorney, Agent, or Firm* — Antonelli, Terry, Stout & Kraus, LLP.

(57) ABSTRACT

Disclosed is a wireless communications device with strong realtime performance, giving rise to no latency in communications even if communications errors arise in the communication frame MAC header. MAC header information is used to determine whether or not the destination address of a received data frame is the address of a concerned wireless communications device (1). MAC header information allocated among a plurality of MAC headers is employed in selecting MAC header information without errors. If all MAC header information is in error, a majority determination processing unit (13) is used to effect a majority determination of the MAC header information and generate correct MAC header information. A received data extraction unit (14) removes the received frame header, etc., extracts the received data, and outputs same to an external device.

6 Claims, 6 Drawing Sheets

(56) References Cited

FOREIGN PATENT DOCUMENTS

| JP | 2006-101061 | 4/2006 |
|----|-------------|--------|
| JP | 2009-533960 | 9/2009 |
| WO | WO 2007/120685 | 10/2007 |

OTHER PUBLICATIONS

JP Office Action for Japanese Application No. 2010-041235, issued on Dec. 17, 2013.

\* cited by examiner

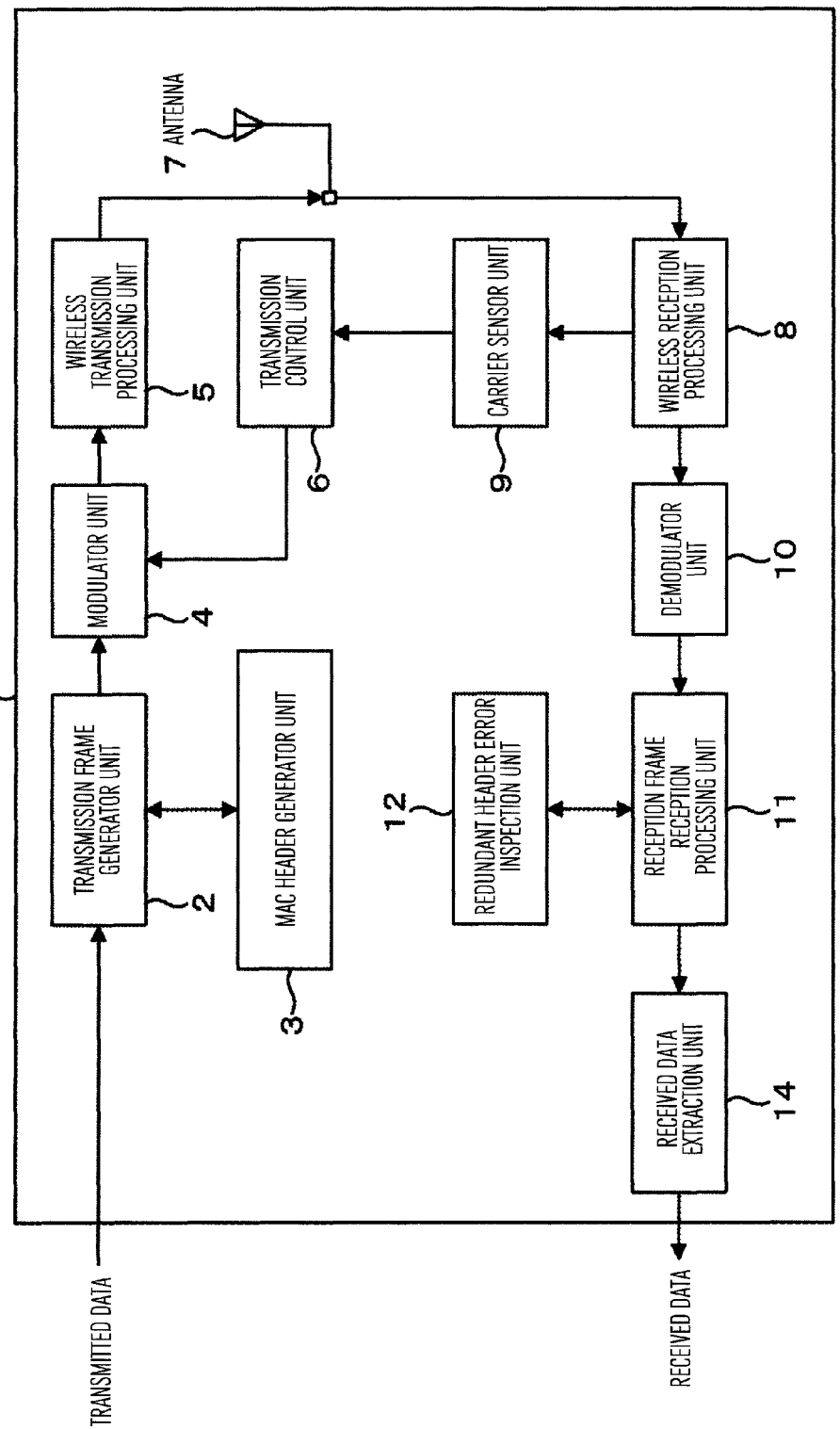

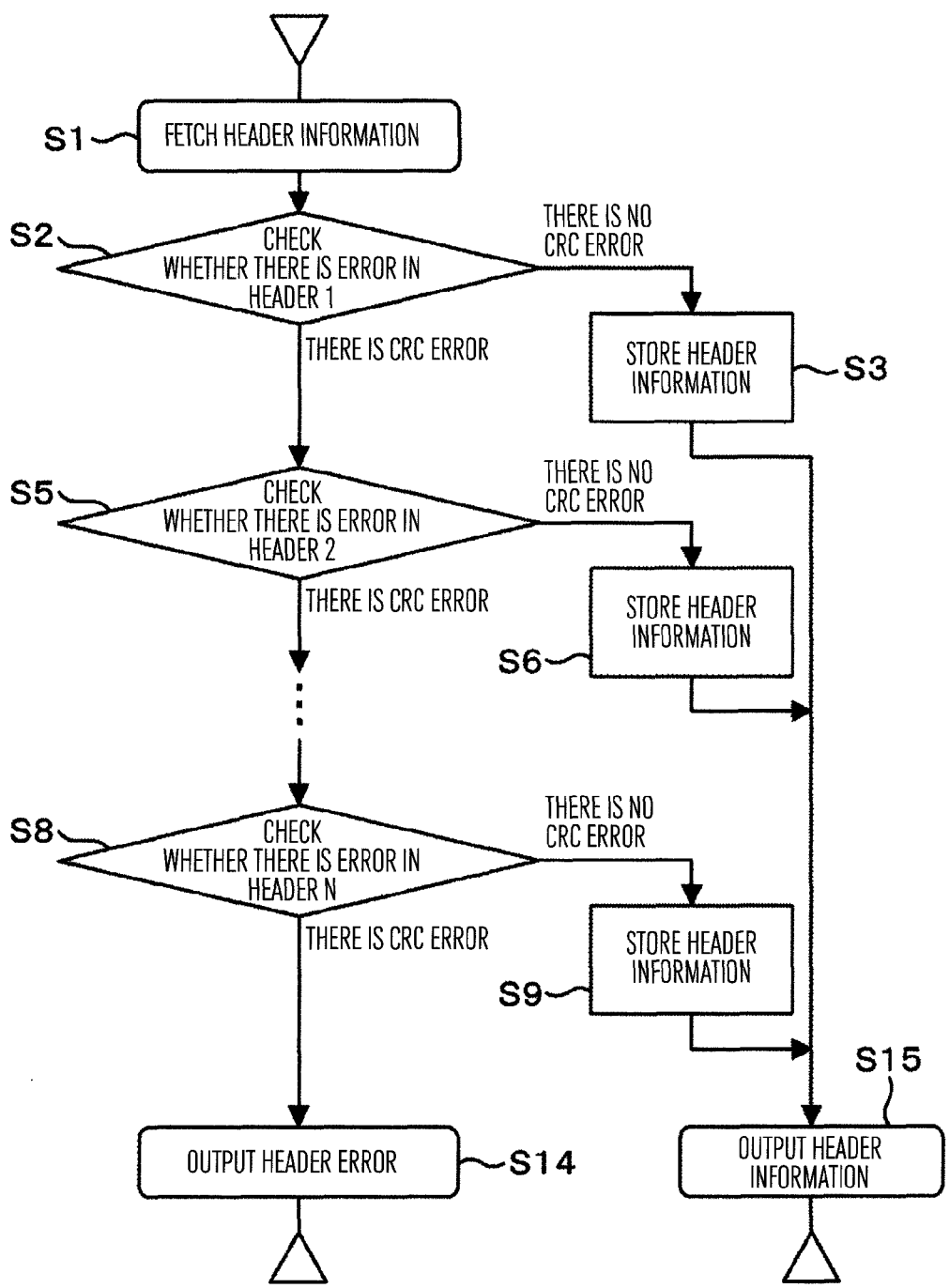

WIRELESS COMMUNICATIONS DEVICE AND WIRELESS COMMUNICATIONS METHOD

TECHNICAL FIELD

The present invention relates to a wireless communication device and a wireless communication method. Particularly, it relates to a wireless communication device and a wireless communication method with real-time performance required.

BACKGROUND ART

In wireless communication, communication error (communication failure) occurs due to noise, interference, attenuation, etc. When a device is being controlled or monitored using wireless communication, it is necessary to take measures to prevent the device from malfunctioning or prevent monitor information from being missed due to communication error. For this reason, retransmission of communication data is often attempted when communication error occurs.

In most cases, a communication frame is generally composed of a physical layer header, an MAC header (hereinafter this expression means physical address-including information) and a data field. There has been known a technique in which this data field is further split into cells so that the cells are subjected to packet transmission after an error checking code is added to each of the cells. Since only the finely split cells need to be retransmitted, lowering of transmission efficiency can be suppressed even if communication error occurs due to noise etc. For example, this technique has been disclosed in JP-A-10-93584.

CITATION LIST

Patent Literature

Patent Literature 1: JP-A-10-93584

SUMMARY OF INVENTION

Technical Problem

Generally, for example, destination information which is a physical address, and frame type (beacon, response, etc.) are set in an MAC header, and data are set in a data field. Among these, according to the aforementioned background-art technique, measures against communication error can be taken when the communication error occurs in the data field of a communication frame, but no examination has been made on occurrence of communication error in the MAC header.

In the aforementioned background-art technique, the communication frame has to be inevitably retransmitted when communication error occurs in the MAC header. As a result, since the communication frame has to be retransmitted when communication error occurs in the MAC header, latency in communication occurs to thereby give rise to a problem that real-time performance in communication will be spoiled.

An object of the invention is to provide a wireless communication device and a wireless communication method in which high real-time performance is achieved by suppressing occurrence of communication latency against error concerned with acquisition of physical address information of a communication frame.

Solution to Problem

In order to attain the foregoing object, the invention is configured in such a manner that a communication frame for transmission is generated by allocating a plurality of physical address information-including information, data error checking codes for detecting respective errors of the plurality of physical address-including information, and data to a communication frame; data of the generated communication frame are modulated into a signal, the signal is transmitted by wireless, a signal received by wireless is demodulated into a communication frame, presence/absence of respective errors in a plurality of physical address information-including information included in the communication frame is checked based on data error checking codes included in the communication frame, and one is selected from the plurality of physical address information or a predetermined physical address is generated from the plurality of physical address-including information based on the checking; and determination is made as to whether the received communication is addressed to the device itself based on the selected or generated physical address information.

Advantageous Effects of Invention

According to the invention, it is possible to cope with an error problem concerned with acquisition of physical address information of a communication frame so that it is possible to suppress communication latency and improve real-time performance.

BRIEF DESCRIPTION OF DRAWINGS

[FIG. 6] A configuration diagram of a wireless communication device according to another embodiment of the invention.

[FIG. 7] A chart showing a processing flow in a redundant header error inspection unit 12 in FIG. 6.

DESCRIPTION OF EMBODIMENTS

Figure 1:
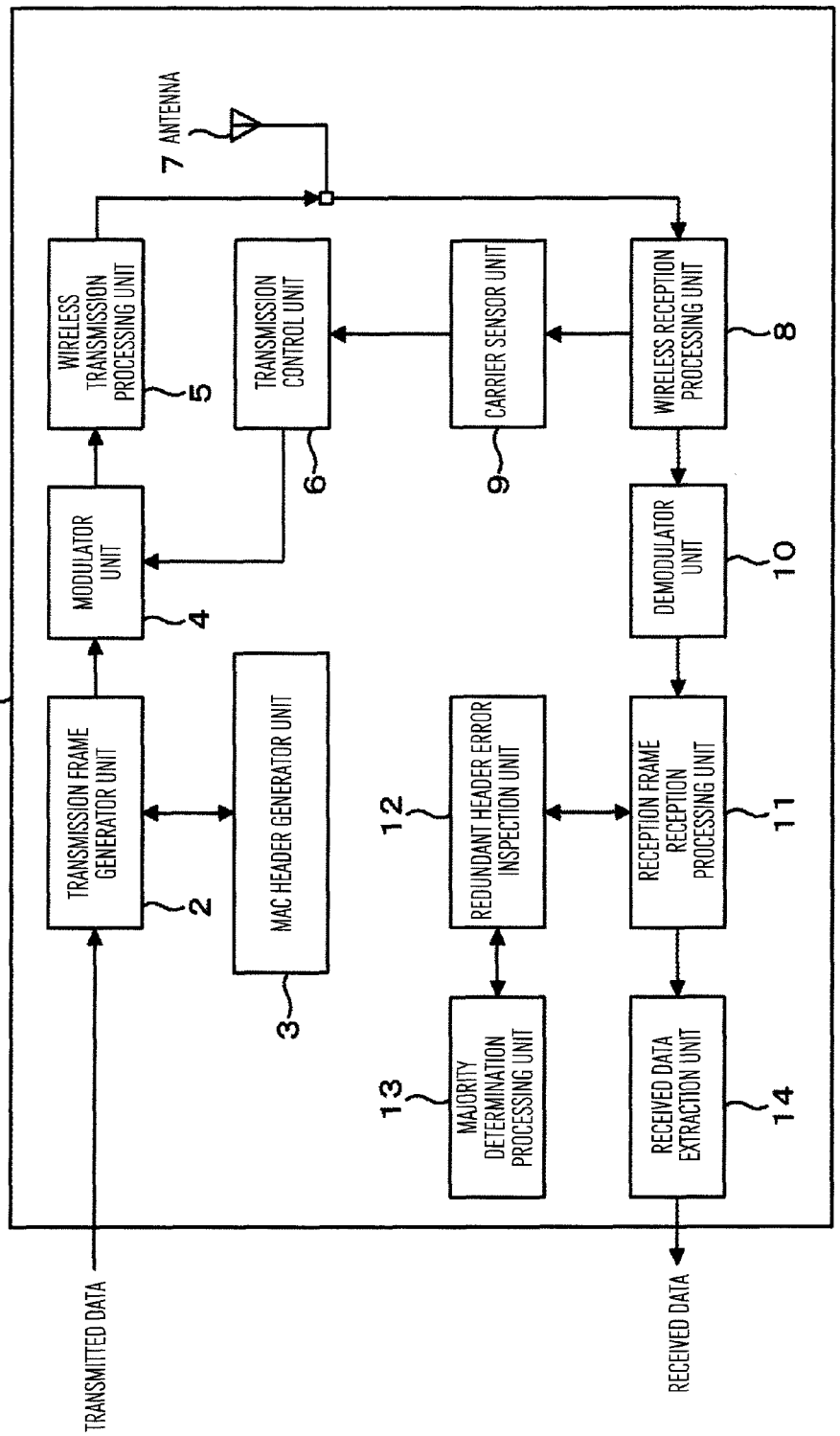
[FIG. 1] A configuration diagram of a wireless communication device according to a first embodiment of the invention.

The invention will be described below in detail with reference to the drawings. FIG. 1 is a block diagram showing an example of a wireless communication device to which the invention is applied. The wireless communication device 1 includes a transmission frame generator unit 2, an MAC header generator unit 3, a modulator unit 4, a wireless transmission processing unit 5, a transmission control unit 6, an antenna 7, a wireless reception processing unit 8, a carrier sensor unit 9, a demodulator unit 10, a reception frame reception processing unit 11, a redundant header error inspection unit 12, a majority determination processing unit 13, and a received data extraction unit 14.

The transmission frame generator unit 2 receives transmitted data from an external device (not shown) and one CRC code-including MAC header information from the MAC header generator unit 3, and generates a transmission frame (corresponding to a communication frame) by allocating the received MAC header information to a plurality of MAC header areas which have been set in advance, and allocating the transmitted data to a data field. For example, destination information and frame type (beacon, response, etc.) are set in the MAC header. The destination information is an MAC address (physical address). The MAC address serves to identify a local address on an LAN (Local Area Network) as against a global address such as a so-called IP address.

The CRC is called cyclic redundancy check. The CRC code is a code for detecting data error. It is a matter of course that any other error checking code than the CRC code may be used. Besides the error checking code for checking whether data are damaged or not, an error correcting code including a function of checking whether data are damaged or not and restoring the data when the data are damaged, may be used.

The modulator unit 4 receives communication frame information outputted from the transmission frame generator unit 2, modulates the communication frame information, and outputs the modulated communication frame information to the wireless transmission processing unit 5. The transmission control unit 6 determines whether to start a transmission process or not based on a carrier sensing result inputted from the carrier sensor unit 9, and makes control to start transmission when the carrier sensing result indicates an "idle state", or makes control to wait for transmission until the carrier sensing result turns into an "idle state" or to switch the wireless channel to another wireless channel when the carrier sensing result indicates a "busy state". The "carrier sensing" is to check whether the channel is idle or not for emitting radio waves (starting communication) from the wireless communication device, and to emit radio waves only when the channel is idle. The wireless transmission processing unit 5 receives the modulated communication frame information, performs a transmission process including digital-to-analog conversion, frequency conversion, filtering, and power amplification on the modulated communication frame information, and transmits the resulting communication frame information as a radio signal from the antenna 7.

The radio signal received through the antenna 7 is inputted to the wireless reception processing unit 8. The wireless reception processing unit 8 performs a reception process including frequency conversion, filtering, wave detection, analog-to-digital conversion and symbol timing synchronization detection on the radio signal. In addition, the radio signal is always inputted to the wireless reception processing unit 8 at any time except a transmission time and an RSSI signal indicating the received signal strength of the radio signal is outputted to the carrier sensor unit 9. The carrier sensor unit 9 determines a use condition of the frequency channel based on the RSSI (Received Signal Strength Indication) signal and outputs a determination result to the transmission control unit 6. When the RSSI (Received Signal Strength Indication) signal is not larger than a predetermined threshold, the carrier sensor unit 9 determines that the frequency channel is an "idle state". When the RSSI signal is larger than the threshold, the carrier sensor unit 9 determines that the frequency channel is a "busy state".

When symbol timing synchronization is detected in the radio reception processing unit 8, a baseband signal obtained by the reception process is outputted to the demodulator unit 10. The demodulator unit 10 demodulates the baseband signal and outputs the modulated baseband signal as a reception frame to the reception frame reception processing unit 11. When the destination address of the received data frame is coincident with the address of the wireless communication device 1, the reception frame reception processing unit 11 outputs the reception frame (corresponding to the communication frame) to the received data extraction unit 14. When the destination address of the received data frame is not coincident with the address of the wireless communication device 1, the reception frame reception processing unit 11 discards the reception frame. MAC header information is used for determining whether the destination address of the received data frame is coincident with the address of the wireless communication device 1 or not. Since the MAC header information is allocated to a plurality of MAC headers, the MAC header information allocated to the plurality of MAC headers is used for selecting or generating correct MAC header information and determining whether the destination address is the concerned address (MAC address included in the MAC header information) or not. The redundant header error inspection unit 12 and the majority determination processing unit 13 are used for this purpose. As will be described later, the redundant header error inspection unit 12 serves to select one piece of MAC header information with no occurrence of error from a plurality of pieces of MAC header information. The majority determination processing unit 13 performs majority determination on these pieces of MAC header information (any other logic operation than the majority determination processing may be used) to thereby generate correct MAC header information when all of the plurality of pieces of MAC header information have error. The redundant header error inspection unit 12 and the majority determination processing unit 13 are collectively referred to as a redundancy selection unit. Although an example in which a determination process, a selection process and a generation process are performed on the MAC header information will be shown below, it is matter of course that the MAC address may be extracted directly so that a determination process etc. is performed on the MAC address.

The received data extraction unit 14 extracts received data by removing the header etc. of the reception frame, and outputs the received data to another device (not shown) connected to the wireless communication device 1.

Figure 2:
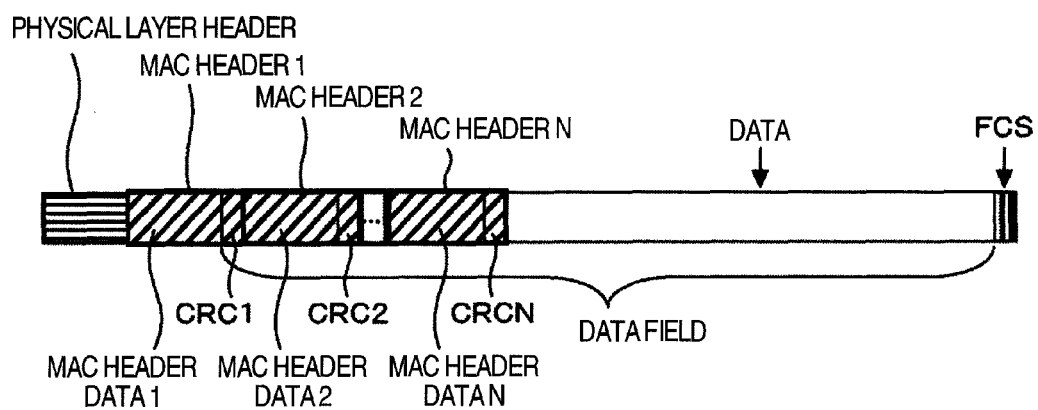
[FIG. 2] A configuration view showing configuration of a communication frame in the invention.

Next, configuration of a communication frame having a plurality of MAC headers will be described with reference to FIG. 2. The communication frame shown in FIG. 2 is composed of a physical header, MAC header data 1, a data field, and an FCS. The data field is composed of CRC1, an MAC header 2, an MAC header N, and data. The reason why the data field is composed of the CRC1, the MAC header 2 and the MAC header N is in that this system can coexist with an ordinary wireless LAN system. That is, the MAC header data 1 has the same configuration as that of the MAC header of an ordinary wireless LAN device. When the ordinary wireless LAN device receives a communication frame from the wireless communication device, the ordinary wireless LAN device can easily determine whether the communication frame is addressed to the ordinary wireless LAN device or not, because the MAC header data 1 has one and the same data configuration as that of the ordinary wireless LAN device. If the data configuration of the MAC header data 1 is different, the possibility that the ordinary wireless LAN device will make special operation based on specific bit data may be thought of. Therefore, measures are taken to prevent such a case from occurring. In FIG. 2, the MAC header 1 is composed of MAC header data 1 and CRC1. The MAC header 2 is composed of MAC header data 2 and CRC 2. The MAC header N is composed of MAC header data N and CRC N. Each CRC is provided for detecting error of MAC header data at the time of reception. In addition, the FCS may be set to check error for all data ranging from MAC header data 1 to data, or may be set to check error for data because CRC is added to each MAC header. In this manner, a plurality of MAC headers are provided in the configuration of the communication frame of the wireless communication device so that any MAC header is normal even if communication error occurs. Further, an error detecting function is added to each MAC header so that error occurring in any MAC header can be detected easily.

Although the CRC's are provided here in the separate areas respectively in order to detect error of the MAC header data at the time of reception, the CRC's may be disposed collectively in one area. Further, configuration may be technically made so that error in some of MAC header data can be detected using one CRC.

Figure 3:
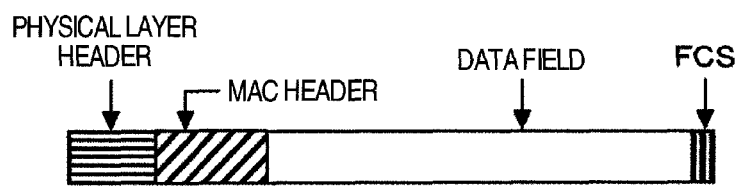
[FIG. 3] A configuration view showing configuration of a communication frame as a reference example.

FIG. 3 shows configuration of an ordinary wireless LAN communication frame as a reference example. It is found from FIG. 3 that there is no CRC added to an MAC header. In addition, an FCS is set to check error for the MAC header and data. It can be said that the configuration of the communication frame of the wireless communication device is high in reliability and high in resistance to communication error, in comparison with the configuration of the ordinary wireless LAN communication frame.

Figure 4:
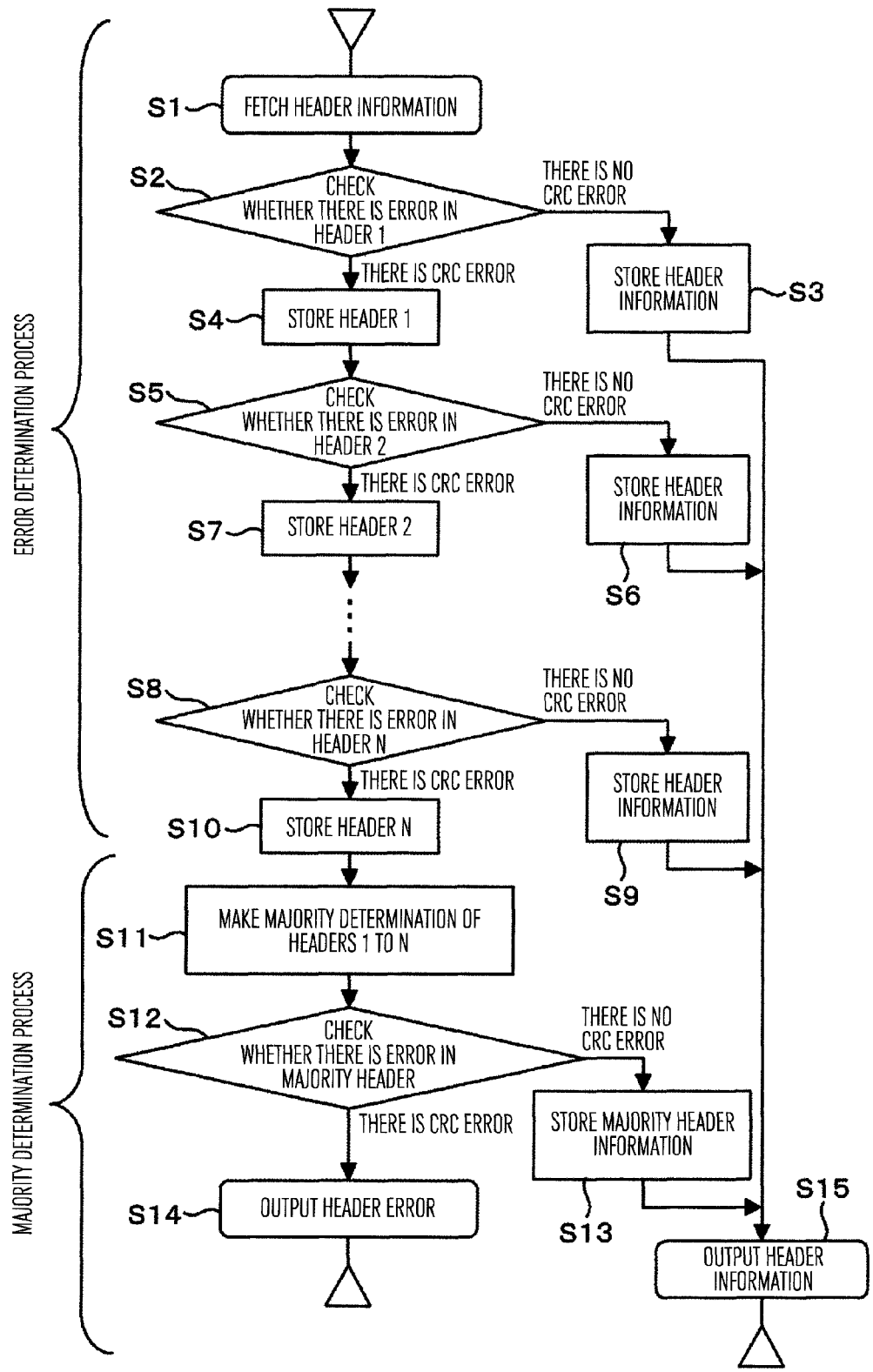
[FIG. 4] A chart showing a processing flow in a redundant header error inspection unit 12 and a majority determination processing unit 13.

FIG. 4 is a processing flow chart for explaining operation of the redundant header error inspection unit 12 and the majority determination processing unit 13. In FIG. 4, an error determination process indicates contents of processing performed by the redundant header error inspection unit 12, and a majority determination process indicates contents of processing performed by the majority determination processing unit 13. The redundant header error inspection unit 12 fetches header information from the reception frame reception processing unit 11 in step S1. That is, MAC header information ranging from the MAC header 1 to the MAC header N in FIG. 2 (referred to as header information for short in FIG. 4) is fetched. Then, in step S2, the CRC1 is used for checking whether error has occurred in the header information (MAC header data and CRC) of the MAC header 1 or not. When no error has occurred, the processing flow goes to step S3, in which the MAC header information is stored. That is, in this case, the header information of the MAC header 1 with no occurrence of error is stored. The header information of the MAC header 1 is outputted to the reception frame reception processing unit 11 in step S15. When error has occurred in the step S2, the processing flow goes to step S4. The header information of the MAC header 1 with error is stored in the step S4. Then, the processing flow goes to step S5. As will be described later, the header information of the MAC header 1 with error, stored in the step S4 is used in the majority determination process of the majority determination processing unit 13.

In the step S5, the CRC 2 is used for checking whether error has occurred in the MAC header 2 or not. When no error has occurred, the processing flow goes to step S6, in which the MAC header information is stored. That is, in this case, the header information of the MAC header 2 with no occurrence of error is stored. The header information of the MAC header 2 is outputted to the reception frame reception processing unit 11 in the step S15. When error has occurred in the step S5, the processing flow goes to step S7. The header information of the MAC header 2 with error is stored in the step S7. Then, the processing flow goes to step S8.

In the step S8, the CRC N is used for checking whether error has occurred in the MAC header N or not. When no error has occurred, the processing flow goes to step S9, in which the MAC header information is stored. That is, the header information of the MAC header N with no occurrence of error is stored in this case. The header information of the MAC header N is outputted to the reception frame reception processing unit 11 in the step S15. When error has occurred in the step S8, the processing flow goes to step S10. The header information of the MAC header N with error is stored in the step S10. Then, the processing flow goes to step S11.

Figure 5:
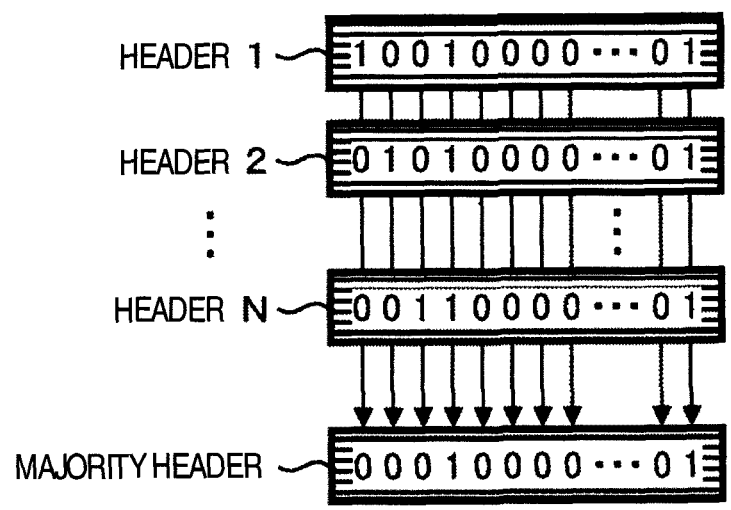
[FIG. 5] A view showing an example of majority determination processing of header information.

The reason why the processing flow goes to the step S11 is because error has occurred in all the MAC headers. For this reason, the majority determination process is performed by the majority determination processing unit 13 using the header information of the MAC headers stored in the steps S4, S7 and S10 respectively. The contents of the process are shown in steps S11, S12, S13, S14 and S15. In the step S11, majority determination is performed on each bit in all header information as shown in FIG. 5. For example, since the rightmost bit in each of the MAC headers (referred to as header for short in FIG. 5) is logic "1", the result of the majority determination is logic "1". In addition, since the leftmost bit in the MAC header 1 is logic "1" and the leftmost bits in the other MAC headers are logic "0", the result of the majority determination is logic "0". Consequently, the majority determination result is logic "00010000 . . . 01". This is a majority determination result about the MAC header data and CRC data.

In the step S12, the CRC of the generated majority determination result is used for determining whether there is error in the majority determination result or not. When no error has occurred, the processing flow goes to the step S13, in which majority header information as the generated majority determination result is stored. That is, the majority header information without error is stored in this case. The majority header information is outputted to the reception frame reception processing unit 11 in the step S15. When error has occurred in the step S12, the processing flow goes to the step S14. In the step S14, the fact that error has occurred in the MAC header is outputted to the reception frame reception processing unit 11. In this case, the reception frame reception processing unit 11 discards the reception frame because the destination address of the received data frame is not coincident with the address of the wireless communication device 1. When the destination address of the received data frame is coincident with the address of the wireless communication device 1, that is, when the header information is received from the step S3, S6, S9 or S13, the reception frame reception processing unit 11 outputs the reception frame (corresponding to the communication frame) to the received data extraction unit 14.

Next, another embodiment will be described. Incidentally, description about the same parts as those in the previously described embodiment will be omitted. The same reference signs will be given in the drawings.

FIG. 6 shows configuration of a wireless communication device from which the majority determination processing unit 13 in FIG. 1 has been removed. The case where a very poor communication environment is provided to give rise to occurrence of communication error extremely frequently is rare so that the wireless communication device shown in FIG. 6 can be used sufficiently in an environment in which communication error does not occur frequently. FIG. 7 is a chart showing a processing flow in a redundant header error inspection unit 12 in the wireless communication device shown in FIG. 6. Since the majority determination process (the steps S11, S12, and S13) in FIG. 5 can be dispensed with, the steps S4, S7 and S10 can be also dispensed with accordingly.

A plurality of MAC headers are provided in one communication frame. Even if communication error occurs in some MAC headers, information of an MAC header with no occurrence of communication error can be selected so that received data can be extracted from a reception frame (corresponding to the communication frame) by MAC processing based on the normal MAC header information. Retransmission of the communication frame which has to be performed in the background art is prevented from being performed and communication latency is prevented from being increased. Thus, effect in the case where the wireless communication device is applied to a monitoring system or a control system with real-time performance required is large. Further, even if communication errors occur in all the plurality of MAC headers, correct MAC header information can be generated based on majority determination of the MAC header information. Accordingly, received data can be extracted from the reception frame (corresponding to the communication frame) based on the generated correct MAC header information. The same effect as that in the above description can be exerted so that the industrial value of the invention is extremely high.

Describing the characteristic portion of the embodiment collectively, it is characterized by providing: a transmission frame generator unit which receives CRC information-including MAC header information and generates a communication frame by allocating the received CRC information-including MAC header information to a plurality of MAC header areas set in advance in the communication frame and allocating transmission data to a data field in the communication frame; a redundant MAC header error inspection unit which checks presence/absence of error in each MAC header information upon reception and selects MAC header information with no error; and a majority determination processing unit which generates MAC header information with no error based on majority determination processing on all pieces of MAC header information when there are errors in all the pieces of MAC header information; wherein determination is made as to whether a received communication frame is addressed to the device itself or not based on the normal MAC header information obtained by the redundant MAC header error inspection unit or the majority determination processing unit. Further, the embodiment is characterized in that: the communication frame is configured in such a manner that one of MAC headers is allocated to the MAC header of the communication frame while the other MAC headers are allocated to the data field so that one and the same MAC header information is allocated to each of the MAC headers. In addition, in the wireless communication device according to the invention, the number of MAC headers is three or more and CRC information is provided in the MAC header information, presence/absence of error in each MAC header information is checked at the time of reception, MAC header information with no error is selected, and information obtained by majority determination of all the pieces of MAC header information is set as MAC header information when there are errors in all the pieces of MAC header information.

That is, one communication frame has a plurality of MAC headers so that information of an MAC header with no occurrence of communication error can be used even if communication error (communication failure) occurs in some MAC headers, or correct MAC header information can be generated based on majority determination of the pieces of MAC header information even if errors (failures) occur in all the MAC headers. Accordingly, it is possible to avoid retransmission of the communication frame which has to be performed in the background art, so that it is possible to suppress increase in communication latency to give rise to improvement in real-time performance.

REFERENCE SIGNS LIST 1 wireless communication device
2 transmission frame generator unit
3 MAC header generator unit
4 modulator unit
5 wireless transmission processing unit
6 transmission control unit
7 antenna
8 wireless reception processing unit
9 carrier sensor unit
10 demodulator unit
11 reception frame reception processing unit
12 redundant header error inspection unit
13 majority determination processing unit
14 received data extraction unit
15 transmission survey unit

The invention claimed is:

1. A wireless communication device which modulates data of a communication frame into a signal, transmits the signal by wireless and demodulates a received signal received by wireless into a received communication frame, comprising:
   a transmission frame generator unit which generates a communication frame for transmission by allocating header information including a physical address-information to a header portion of the communication frame, and also allocating a plurality of redundant pieces of the header information and data error checking codes for detecting respective errors of the plurality of the redundant pieces of the header information to a data portion of the communication frame;
   a redundancy selector/generator unit which checks presence/absence of the respective errors in the plurality of the redundant pieces of the header information from the received communication frame based on the data error checking codes, and selects one from the plurality of the redundant pieces of the header information contained in the received communication frame or generates a predetermined physical address from the redundant pieces of the header information based on the checking; and
   a determination unit which determines whether the received communication frame is addressed to the wireless communication device or not, based on the physical address information selected or generated by the redundancy selector/generator unit,
   wherein a majority determination processing is performed when determination is made that all the redundant pieces of the header information in the checking are in error.

2. The wireless communication device according to claim 1, wherein the data error checking codes are provided correspondingly to the plurality of the redundant pieces of the header information, respectively.

3. The wireless communication device according to claim 2, wherein the predetermined physical address obtains the physical address information by applying a logic operation on the plurality of redundant pieces of the header information.

4. The wireless communication device according to claim 3, wherein the logic operation is the majority determination processing of the plurality of the redundant pieces of the header information.

5. The wireless communication device according to any one of claims 1 to 4, wherein an error checking code for information including the redundant pieces of the header information and the data, is further allocated to the communication frame.

6. A wireless communication method comprising:
   generating a communication frame for transmission by allocating header information including a physical address-information to a header portion of the communication frame, and also allocating a plurality of redundant pieces of the header information and data error checking codes for detecting respective errors of the plurality of the redundant pieces of the header information to a data portion of the communication frame;

modulating data of the generated communication frame into a signal, transmitting the signal by wireless, demodulating a received signal received by wireless into a received communication frame, checking presence/absence of the respective errors in the plurality of the redundant pieces of the header information included in the received communication frame based on the data error checking codes included in the received communication frame, and selecting one from the redundant pieces of the header information included in the received communication frame or generating a predetermined physical address from the redundant pieces of the header information based on the checking;

determining whether the received communication frame is addressed to a concerned device or not based on the selected or generated physical address information; and performing a majority determination processing when determination is made that all the redundant pieces of the header information in the checking are in error.

\* \* \* \* \*